(12) United States Patent
Berendes et al.

(10) Patent No.: US 11,984,786 B2
(45) Date of Patent: May 14, 2024

(54) CANNED MOTOR

(71) Applicant: Dr. Ing. h.c. F. Porsche Aktiengesellschaft, Stuttgart (DE)

(72) Inventors: Philipp Berendes, Stuttgart (DE); Stefan Oechslen, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/688,947

(22) Filed: Mar. 8, 2022

(65) Prior Publication Data

US 2022/0294302 A1    Sep. 15, 2022

(30) Foreign Application Priority Data

Mar. 10, 2021  (DE) .................. 10 2021 105 759.0

(51) Int. Cl.
  *H02K 5/128* (2006.01)
  *H02K 9/197* (2006.01)
  *H02K 15/14* (2006.01)

(52) U.S. Cl.
  CPC ............ *H02K 5/128* (2013.01); *H02K 9/197* (2013.01); *H02K 15/14* (2013.01)

(58) Field of Classification Search
  CPC ......... H02K 5/128; H02K 9/197; H02K 15/14
  USPC ..................................................... 310/62, 66
  See application file for complete search history.

(56) References Cited

U.S. PATENT DOCUMENTS

| | | | |
|---|---|---|---|
| 10,938,265 B2 | 3/2021 | Berendes et al. | |
| 2013/0136630 A1 | 5/2013 | Eguchi | |
| 2013/0272904 A1 | 10/2013 | Hozumi et al. | |
| 2018/0076694 A1 | 3/2018 | Aronovich et al. | |

FOREIGN PATENT DOCUMENTS

| | | | | |
|---|---|---|---|---|
| DE | 1802561 U | | 12/1959 | |
| DE | 1802561 A1 | | 5/1970 | |
| DE | 102010055823 A1 | * | 6/2012 | |
| DE | 202010018078 A1 | | 1/2014 | |
| DE | 102018115927 A1 | | 1/2020 | |
| DE | 102019117373 A1 | | 12/2020 | |
| DE | 102019120824 A1 | | 2/2021 | |
| DE | 102019120824 A1 | * | 2/2021 | |
| EP | 1271747 A1 | * | 1/2003 | ............ H02K 5/128 |
| JP | S 576354 U | | 1/1982 | |
| JP | S 57168971 U | | 10/1982 | |
| JP | 2011193572 A | | 9/2011 | |
| JP | 2011193572 A | * | 9/2011 | |
| JP | 2014057506 A | | 3/2014 | |
| JP | 2014057506 A | * | 3/2014 | ............ F04D 17/08 |

\* cited by examiner

*Primary Examiner* — Jose A Gonzalez Quinones
(74) *Attorney, Agent, or Firm* — LEYDIG, VOIT & MAYER, LTD.

(57) ABSTRACT

A canned motor includes a stator with a laminated core and a winding with winding heads, and including a rotor, which is mounted so as to be rotatable relative to the stator, and a can element, which is arranged between the stator and the rotor, and a support ring, which is coupled to the can element. The support ring on its own and/or together with the can element provides a support section which extends at least partially axially adjacent to the laminated core. The support section lies with a seal section against a seal device such that a rotor space is sealed off in coolant-tight fashion with respect to a stator space.

19 Claims, 1 Drawing Sheet

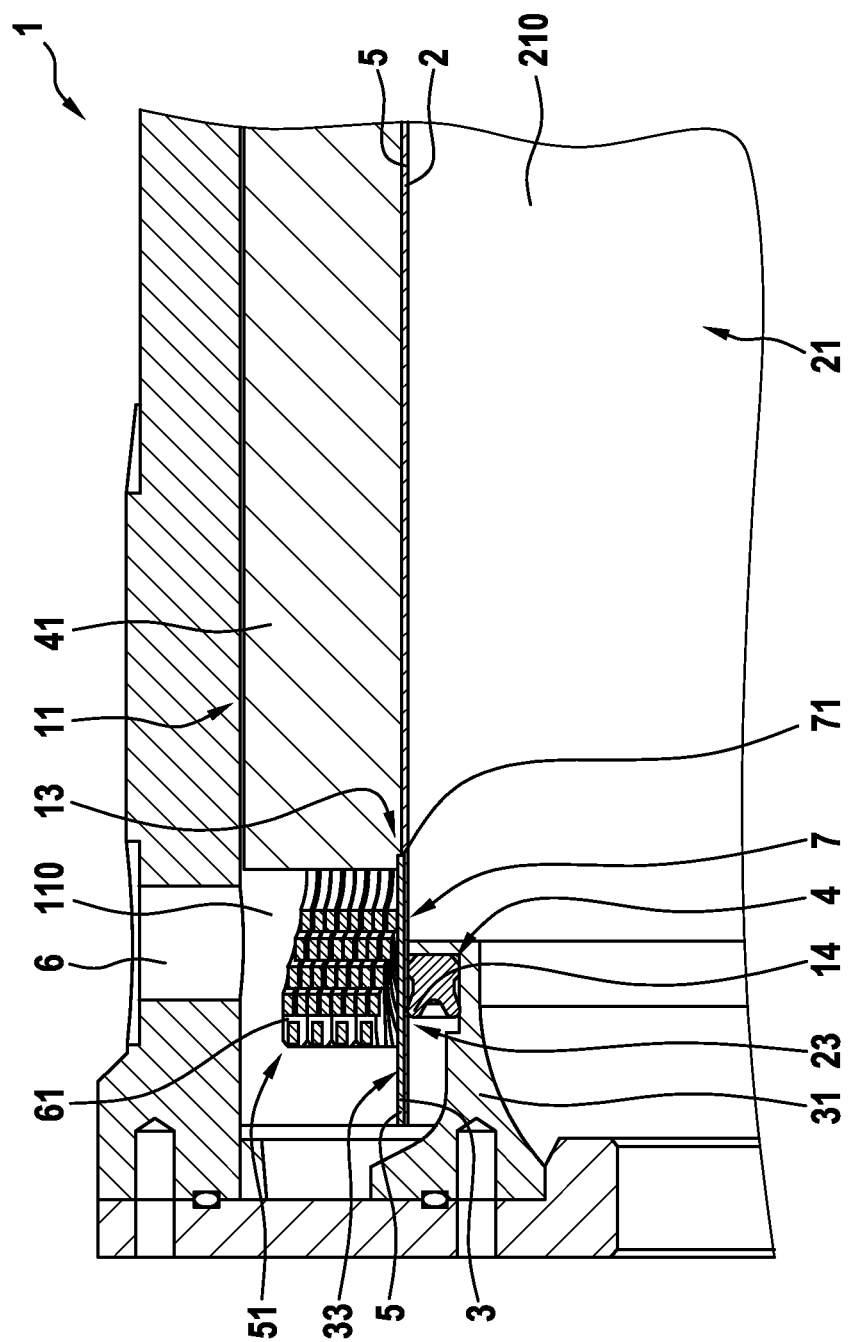

CANNED MOTOR

CROSS REFERENCE TO RELATED APPLICATIONS

This application claims benefit to German Patent Application No. DE 10 2021 105 759.0, filed on Mar. 10, 2021, which is hereby incorporated by reference herein.

FIELD

The present disclosure relates to canned electric motors.

BACKGROUND

Canned motors are normally designed as electric drive machines and for example as permanent-magnet synchronous machines. Canned motors are often cooled by way of direct winding head cooling in the case of which a liquid cooling medium is caused to flow around the winding heads of a stator winding.

A canned motor of said type is known from DE 10 2018 115 927 A1. The canned motor described therein reliably satisfies its requirements. It is nevertheless desirable to further develop and improve said canned motor.

SUMMARY

In an embodiment, the present disclosure provides a canned motor comprising a stator with at least one laminated core and at least one winding with winding heads, a rotor, which is mounted so as to be rotatable relative to the stator, at least one can element, which is arranged between the stator and the rotor, and at least one support ring, which is coupled to the at least one can element, wherein the at least one support ring on its own and/or together with the at least one can element provides a support section which extends at least partially axially adjacent to the at least one laminated core, the support section lies with at least one seal section against at least one seal device such that a rotor space is sealed off in coolant-tight fashion with respect to a stator space, and the support section has an end section which extends from the seal section to an axial end of the support section, the end section being configured to be exposed at least in an axial direction.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 is a purely schematic detail illustration of a canned motor according to an embodiment of the invention in a sectional side view.

DETAILED DESCRIPTION

In some embodiments, a canned motor which affords reliable coolant leak-tightness under the intended operating conditions and which is at the same time straightforward and economical to produce is provided. It is preferably also sought for the canned motor to have the lowest possible weight. Further advantages of the present invention will emerge from the general description and from the description of the exemplary embodiment.

An embodiment of the present invention relates to a canned motor, with a stator with at least one laminated core and at least one winding with winding heads, and with a rotor which is mounted so as to be rotatable relative to the stator. At least one can element is arranged between the stator and the rotor. For example, the can element is a separate can or is a liner, which, during the course of its production with the stator, is connected (in particular in form-fitting and/or cohesive fashion) to the stator. At least one support ring is coupled to the can element. The support ring on its own and/or together with the can element provides a support section which extends at least partially axially adjacent to the laminated core. The support section lies with at least one seal section against at least one seal device such that a rotor space is sealed off in coolant-tight fashion with respect to a stator space.

The canned motor according to an embodiment of the invention comprises a stator with at least one laminated core and at least one winding with winding heads. The canned motor comprises at least one rotor which is mounted (in particular on a housing structure) so as to be rotatable relative to the stator. The canned motor comprises at least one can element. The can element is arranged (in a radial gap) between the stator and the rotor. The canned motor comprises at least one support ring. The support ring is coupled to the can element. The support ring, at least partially on its own and/or at least partially together with the can element, provides a support section. The support section extends at least partially axially adjacent to the laminated core. In some embodiments, the support section projects axially beyond the laminated core. The support section lies with at least one seal section against at least one seal device. In some embodiments, a rotor space is sealed off in coolant-tight fashion with respect to a stator space. In some embodiments, the support section comprises an end section which extends from the seal section to an axial end of the support section (in particular of the support ring and/or of the can). In some embodiments, the support section is configured to be exposed at least in an axial direction.

Embodiments of the present invention offer numerous advantages. A considerable advantage is afforded by the support section with its exposed end section. Thermally induced expansions or mechanically induced movements during the operation of the canned motor can thus be particularly advantageously compensated. A further advantage is afforded by the seal section positioned in front of the end section. In this way, with the decoupling, a reliable seal of the rotor space with respect to the stator space is also ensured at the same time. Embodiments of the present invention furthermore offer the advantage that the decoupling and seal can be implemented straightforwardly in terms of design, and the motor can be manufactured particularly economically.

It is preferable and advantageous for the end section to also be configured to be exposed in a radial direction. In some embodiments, the end section is configured to be entirely exposed. It is particularly preferable for the (entire) support section outside the seal section to be configured to be exposed. In some embodiments, the end section, preferably the entire support section outside the seal section, is configured to be exposed at its radial outer side and/or at its radial inner side. Preferably, the end section has a spacing to surrounding components and preferably to a housing structure, which spacing corresponds to at least two times and, in some embodiments, three times a wall thickness of the support ring. In some embodiments, it is preferable for at least one axial end of the support ring to be configured to be exposed in an axial direction and/or radial direction.

The seal device is in particular fastened to a housing structure. The housing structure is in particular formed as a bearing plate and/or end-side flange or comprises at least one bearing plate and/or end-side flange. In all embodiments, it is preferable for the end section to be spaced apart from the housing structure. In some embodiments, the support section is preferably supported, and in particular radially supported, on the housing structure (only) by means of the seal device. The seal device preferably comprises at least one sealing lip and preferably an elastic sealing lip and particularly preferably an elastomer sealing lip. Such a support affords a particularly advantageous decoupling of the components and at the same time also reliable support of the support ring and can. In some embodiments, the seal device lies with a radial inner side and/or with at least one axial side against the housing structure.

The seal section is preferably arranged on a radial inner side of the support section. This arrangement is in particular such that the support section lies with its radial inner side against the seal device and preferably the elastomer sealing lip. In some embodiments, the support section circumferentially surrounds the seal device. In some embodiments, the support section is sealed off radially inwardly by means of the seal device. The support section may also lie with its radial outer side and/or with an axial side against the seal device.

In some embodiments, the can element is arranged on a radial inner side of the support ring. This arrangement is in particular such that the can element is supported with a radial outer side against a radial inner side of the support ring. The can element may be arranged on a radial outer side of the support ring. This arrangement is in particular such that the can element is supported with a radial inner side against the radial outer side of the support ring.

It is possible and advantageous for the can element and the support ring to at least partially overlap in a joining region. In some embodiments, in the joining region, the can element and the support ring may transition into one another in a flush manner radially at the inside and/or radially at the outside. The joining region may extend over part or even the entirety of the support section, or even beyond this. In some embodiments, it is preferable for the support ring and the can elements to be separate components.

It is possible and advantageous for the end section to be at least partially fluidically connected at a radial inner side to the stator space. Such an embodiment allows a particularly advantageous cooling action in combination with the decoupling. As a result of the exposed configuration, a coolant can flow on a radial inner side of the end section as far as the seal device or as far as the seal section.

In some embodiments, it is preferable and advantageous for the support ring to also be attached to the laminated core. In some embodiments, the support ring is fastened to the laminated core. In some embodiments, the laminated core and the support ring at least partially overlap. It is possible for the laminated core and the support ring to transition into one another in a flush manner at their radial inner side.

The support ring is preferably joined to the laminated core in force-fitting fashion. The support ring is preferably joined to the laminated core exclusively in force-fitting fashion. This prevents thermally or mechanically induced changes in the laminated core from affecting the support ring and thus also the coolant leak-tightness. The support ring is preferably joined to the laminated core by means of a radial fit, and preferably exclusively by means of a radial fit. In some embodiments, such a join is provided over the entire intended operating temperature range of the motor. In some embodiments, the support ring is not cohesively joined to the laminated core. In some embodiments, for the radial fit, (in each case) at least one axial shoulder is provided in the support ring and/or in the laminated core.

It is preferable for the support ring to be manufactured from at least one fiber composite material. The support ring preferably has an at least two-layer and, in some embodiments, multi-layer layered construction of the fiber composite material. In some embodiments, a glass-fiber-reinforced and/or carbon-fiber-reinforced plastic is provided. Aside from the advantages with regard to thermal expansion, such a composite material furthermore affords electromagnetic neutrality. Furthermore, in the case of a support ring composed of fiber composite material, the above-described shoulder can also be produced particularly straightforwardly. For example, the shoulder may be ground to the desired fit dimension. It is however also possible for the support ring to be manufactured from a metal material and for example from aluminum or steel.

In some embodiments, the support ring is laminated onto the can element (in the joining region). The support ring is in particular laminated onto the can element from radially outside. For this purpose, the layers of the fiber composite material are in particular laid onto the can element in targeted fashion. This affords a reliable support action and at the same time allows adequate expansion behavior during operation. It is also possible for the can element to be laminated onto the support ring. In all embodiments, it is preferable for the support ring not to be adhesively bonded to the can element. In some embodiments, no adhesive connection, and preferably also no other cohesive connection, is provided in the joining region.

The support ring and the can element are preferably manufactured at least partially from an identical material and preferably from the fiber composite material. This has proven to be particularly advantageous for the thermal expansion behavior during the operation of the canned motor. In some embodiments, the support ring and the can element are manufactured from an electrically non-conductive or only very poorly conductive material.

The can element may have a wall thickness of at most one millimeter and preferably at most 0.7 mm and, in some embodiments, preferably at most 0.5 mm. For example, a wall thickness of 0.4 mm+/−10% is provided. In some embodiments, the support ring has a wall thickness that corresponds to at most six times and preferably at most five times and particularly preferably at most four times the wall thickness of the can. For example, the support ring has a wall thickness of 1.6 mm+/−10%.

In some embodiments, the support ring is manufactured from a material that has a coefficient of thermal expansion that is adapted to a coefficient of thermal expansion of the laminated core. Consideration is given here in particular to the expansion in a radial direction. In some embodiments, the coefficients of expansion of the support ring and of the laminated core are at least approximately equal, and are for example equal with a deviation of +/−10%. In some embodiments, it is preferable for the material of the support ring to have a coefficient of thermal expansion that is adapted to the coefficient of expansion of steel, and is for example $12 \times 10^{-6}$ 1/K. In this way, a detachment during the hardening and tempering of the stator can be counteracted.

The adaptation of the coefficient of expansion is preferably implemented by means of a layered construction and particularly preferably by means of a targeted orientation of the fiber angles of the fiber composite material. In some embodiments, the fiber angles are oriented such that the desired coefficient of expansion in a radial direction is achieved.

In some embodiments, the winding heads protrude out of the laminated core axially at an end side. In some embodiments, the seal section is preferably arranged in an axial position at least partially overlapping the winding heads. In some embodiments, the seal section is situated radially further to the inside than the winding heads. It is also possible for the joining region to be arranged in an axial position at least partially overlapping the laminated core. The joining region may also be arranged at least partially in an axial position overlapping the winding heads. Such an arrangement of the seal section under the winding heads affords numerous advantages. In some embodiments, the can element is, in the region of the winding heads, supported (only) by the support ring. The can element may end axially before the winding heads, or may at least partially axially overlap the winding heads. In some embodiments, the winding heads project axially beyond the support ring. The support ring may also project axially beyond the winding heads.

It is preferable for the support ring to be arranged spaced apart from the winding heads. The support ring preferably does not make contact with the winding heads. If a potting compound is provided, the support ring in particular does not make contact with the potting compound of the winding heads. In some embodiments, at least the end section and preferably the entire support section is arranged spaced apart from the winding heads.

In some embodiments, the canned motor comprises at least two support rings. It is preferable for a respective axial end of the can to be assigned at least one support ring. In some embodiments, the can element is supported at its axial ends by means of in each case at least one support ring. In some embodiments, the support rings are configured and arranged as described above. It is possible for the same arrangement of the support rings to be provided at both axial ends. It is also possible for different configurations or arrangements of the support rings to be provided at the respective axial ends. The can element is preferably supported radially by means of at least two support rings, which are arranged at opposite axial ends, on a respective seal device.

In the context of the present invention, an exposed form is to be understood to mean a spaced-apart arrangement in relation to other components of the canned motor and preferably in relation to a housing structure. In the context of the present invention, the position terms "axial" and "radial" relate to a longitudinal axis or axis of rotation of the canned motor. In the context of the present invention, a canned motor is to be understood to mean a canned electric machine, such that the canned motor according to the invention may be a motor or a generator.

In some embodiments, the can element is fastened to a stator. In some embodiments, the can element lies with a radial outer side against a radial inner side of the stator. In some embodiments, the support ring is not fastened to a rotor. In some embodiments, the can element projects beyond the axial ends of the stator. In some embodiments, the can element lies with an outer circumferential surface against the stator. In some embodiments, the can element alone, or in combination with the at least one support ring, is suitable and configured for sealing off the rotor space with respect to the stator space. It is possible for the at least one support ring and preferably the at least two support rings to lengthen the can element such that there is a fluid-tight separation between the stator space and rotor space.

In the support section, the can element and the support ring may partially or even completely axially overlap. The can element and the support ring are then preferably coupled to one another within the support section. It is however also possible for only the support ring to extend in the support section. The can element and the support ring are then preferably coupled to one another outside the support section, and in particular outside the end section.

The can element and the support ring may be coupled to one another at an axial position that at least partially overlaps the laminated core. The can element and the support ring may also be coupled to one another at least partially axially adjacent to the laminated core. The can element and the support ring may be coupled to one another at least partially in the end section.

The can element preferably extends over the entire axial length of the support ring. The can element and the support ring preferably have a common axial end. The support section is then formed by the can element and the support ring together. It is however also possible for the can element to extend only over a part of the axial length of the support ring. The support ring then preferably projects beyond the axial end of the can. In some embodiments, the support section may be formed by the support ring alone or else in part by the can element and the support ring together.

In the support section, the support ring may be arranged partially, or else with its entire axial length, concentrically with respect to the can element. In some embodiments, the support ring may be arranged at an inner side or at an outer side of the can. In some embodiments, the end section is situated opposite an axial end of the support ring that faces toward the laminated core. In some embodiments, the end section faces away from the laminated core.

It is possible for the canned motor to comprise at least one end disk (also referred to as face disk) which is arranged at an axial end side of the laminated core and in particular extends parallel thereto. The end disk can thus also be referred to as face disk. In some embodiment, it is particularly preferable for the support ring to be arranged spaced apart from the end disk. In some embodiments, the support ring is not connected to the end disk. In some embodiments, the end disk and the support ring are manufactured from different materials. In some embodiments, the end section is configured to be exposed such that it is spaced apart from the end disk. This allows thermal and/or mechanical decoupling from the end disk, which has proven to be particularly advantageous.

In some embodiments, a can element is preferably to be understood to mean both a can and a liner. In some embodiments, the can element comprises at least one can or is configured as a can. The can may be configured as a separate component. The can may be producible separately from the stator. In the operational state of the canned motor, the can may be fixedly installed. Alternatively or in addition, the can element may comprise at least one liner or may be formed as a liner. The liner may be producible or produced (for example cured) at least partially in the stator. The stator may serve at least partially as a molding tool for the production of the liner. For example, the liner is laminated onto the stator (at least in the joining region). The liner may be connected in form-fitting and/or cohesive fashion to the stator. The liner is preferably connected to the stator in a fixed manner (in particular so as not to be non-destructively detachable). The can element may also be referred to as stator seal.

Further advantages of the present invention will emerge from the exemplary embodiments, which will be discussed below with reference to the appended FIGURES.

FIG. 1 shows, in a detail, a canned motor 1 according to an embodiment of the invention, which in this case allows direct cooling of a winding 51 of a stator 11. The stator 11 is equipped with a laminated core 41, at the end sides of which winding heads 61 of the winding 51 protrude. The canned motor 1 furthermore comprises a rotor 21. The rotor is mounted rotatably on a housing structure 31. The housing structure 31 is in this case a bearing plate or flange, for example. For a better overview, only one axial side of the canned motor 1 is shown here. The opposite side is preferably of analogous configuration.

Formed between the stator 11 and the rotor 21 is a radial gap, in which a can element 2 extends. In each case one support ring 3 is arranged on those sections of the can 2 which project beyond the axial ends of the stator 11. This results in a fluid-tight separation of a stator space 110, through which coolant flows, from a rotor space 210. The can element 2 is likewise equipped with a support ring 3 at the axial end that is not shown here. In some embodiments, the support and sealing is realized there in an analogous manner. The can element 2 is supported radially by the support rings 3.

During operation, a liquid coolant is admitted via a cooling channel 6 into the stator space 110 and flows there along the winding heads 61 and the rest of the winding 51. The warmed coolant can then be discharged from the stator space 110 again via a further cooling channel 6.

In some embodiments, together with the can element 2, the support ring 3 forms a support section 7, which is supported with a seal section 23 against a seal device 4. In some embodiments, the seal device 14 is fastened to the housing structure 31 and has an elastomer device 14. The support section extends here from the laminated core to the end of the support ring 3 or of the can 2.

In order to ensure thermal and mechanical decoupling from the housing structure 31 and other adjacent components, the support section 7 is equipped here with an exposed end section 33. The end section 33 is in this case spaced apart from all adjacent components in an axial direction and also radially inwardly and radially outwardly. The end section 33 extends from the seal section 23 to the adjacent axial end of the support section 7. As a result, the can element 2 and the support ring 3 have no contact here with the housing structure 31, and are thus supported exclusively on the elastomer seal 14. In some embodiments, the support ring 3 also does not make contact with the winding heads 61 or the potting compound thereof. The support section 7 is thus configured to be entirely exposed outside the seal section 33.

In the embodiment shown here, the support ring 3 is arranged on a radial outer side of the can 2. Provision may however also be made for the can element 2 to be arranged on a radial outer side of the support ring 3. The can element 2 and the support ring 3 are in this case arranged so as to overlap one another along a joining region 13. For example, the support ring 3 has a wall thickness of 1.6 mm here. For example, the can element 2 has a wall thickness of 0.4 mm here.

The support ring 3 is manufactured here from a fiber composite material 5. This allows the coefficients of thermal expansion to be adapted to the laminated core 41 of the stator 11. The can element 2 is preferably also manufactured from a fiber composite material 5. The can element 2 is then configured for example as a liner that is laminated onto the inner contour of the laminated core 41. Then, the support ring 3 may for example be laminated partially or entirely onto the can element 2 radially at the inside in the joining region 13.

In some embodiments, the fiber composite material 5 has at least two and preferably three or more layers. Through the use of fiber composite material, the support ring 3 in this case has particularly low electrical conductivity and thus prevents interferences and power losses. It is furthermore possible in this way to achieve a considerably lower weight than, for example, in the case of a metallic support ring 3.

In addition to the attachment to the can element 2, the support ring 3 is in this case also attached to the laminated core 41. In some embodiments, the support ring 3 and the laminated core 41 are joined exclusively in force-fitting fashion by means of a radial fit. For this purpose, the laminated core 41 has a shoulder 71. Alternatively or in addition, a shoulder 71 may also be formed in the support ring 3. For example, the support ring 3 is ground to the desired fit dimension in the region of the shoulder 71. This is advantageous in particular if the support ring 3 is manufactured from a fiber composite material 5. In some embodiments, the remaining region is left unground.

In some embodiments, no adhesives or the like are used for the connection of support ring 3 and laminated core 41. The joining is performed here in purely force-fitting fashion, and not cohesively, over the entire operating temperature range of the canned motor 1. This is also made possible by the adapted coefficient of thermal expansion of the support ring 3 in the circumferential direction.

In some embodiments, the fiber composite material 5 has a coefficient of thermal expansion that is adapted to the thermal coefficient of expansion of the laminated core 41. The laminated core 41 is composed here of steel. For example, here, the coefficient of expansion is $12 \times 10^{-6}$ 1/K. The adaptation of the coefficient of expansion to that of steel is realized for example by means of a layered construction, and for example through configuration of the fiber angles. In this way, an undesired detachment of the can 2 and of the support ring 3 during the hardening and tempering of the stator 11 and in the event of warming during the operation of the motor can be reliably prevented.

The support ring 3 proposed here serves for supporting the can 2 in the region of the winding heads 61 and at the same time provides the seal section 23 for the sealing of the stator space 110 and rotor space 210. In some embodiments, the invention affords the particular advantage that the support ring 3 and the can element 2 have no connection whatsoever to the housing structure 31 outside the sealing section 23. Reliable support and a reliable sealing action are thus achieved in combination with thermal and mechanical decoupling.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Canned motor
2 Can element
3 Support ring
4 Seal device
5 Fiber composite material
6 Cooling channel
7 Support section
11 Stator
13 Joining region
14 Elastomer sealing lip
21 Rotor
23 Seal section
31 Housing structure
33 End section
41 Laminated core
51 Winding
61 Winding head
71 Shoulder
110 Stator space
210 Rotor space

The invention claimed is:
1. A canned motor comprising:
a stator with at least one laminated core and at least one winding with winding heads;
a rotor, which is mounted so as to be rotatable relative to the stator;
at least one can element, which is arranged between the stator and the rotor; and
at least one support ring, which is positioned radially adjacent to the at least one can element, wherein:
the at least one support ring on its own and/or together with the at least one can element provides a support section which extends at least partially axially adjacent to the at least one laminated core,
the support section lies with at least one seal section of the at least one support ring against at least one seal device such that a rotor space is sealed off in coolant-tight fashion with respect to a stator space, and
the support section has an end section of the at least one support ring which extends from the seal section to an axial end of the support section extending beyond the at least one seal device, the end section being configured to be exposed at least in an axial direction of the axial end of the support section, and the same end section being configured to be exposed in a radial direction on a radial outer side of the support section.

2. The canned motor as claimed in claim 1, wherein the support section outside the seal section is configured to be entirely exposed.

3. The canned motor as claimed in claim 1, wherein the seal device is fastened to a housing structure, and wherein the support section is supported on the housing structure only by means of the seal device, and wherein the seal device comprises at least one elastomer sealing lip.

4. The canned motor as claimed in claim 1, wherein the seal section is arranged at a radial inner side of the support section such that the support section lies with its radial inner side on the seal device.

5. The canned motor as claimed in claim 1, wherein the at least one support ring is also attached to the laminated core.

6. The canned motor as claimed in claim 1, wherein the at least one support ring is joined to the laminated core exclusively in force-fitting fashion by a radial fit.

7. The canned motor as claimed in claim 1, wherein the at least one support ring is manufactured from a fiber composite material and has an at least two-layer layered construction.

8. The canned motor as claimed in claim 1, wherein the at least one can element is laminated onto the at least one support ring and is not adhesively bonded to the at least one support ring.

9. The canned motor as claimed in claim 1, wherein the at least one support ring and the at least one can element are manufactured at least partially from an identical material or from an identical fiber composite material.

10. The canned motor as claimed in claim 1, wherein the material of the at least one support ring has a coefficient of thermal expansion that is adapted to a coefficient of thermal expansion of the laminated core.

11. The canned motor as claimed in claim 10, wherein adaptation of the coefficient of thermal expansion of the at least one support ring is realized by a layered construction and a targeted orientation of fiber angles of a fiber composite material.

12. The canned motor as claimed in claim 1, wherein the winding heads project axially at an end side out of the laminated core, and wherein the seal section is arranged in an axial position at least partially overlapping the winding heads.

13. The canned motor as claimed in claim 1, wherein the at least one support ring is arranged spaced apart from the winding heads and does not make contact with a potting compound of the winding heads.

14. The canned motor as claimed in claim 1, wherein the end section is at least partially fluidically connected at a radial inner side of the stator space.

15. The canned motor as claimed in claim 1, comprising at least two support rings, wherein each axial end of the at least one can elements is configured to include at least one of the at least two support rings.

16. The canned motor as claimed in claim 1, wherein the end section further extends beyond the seal section to an opposite axial end of the support section.

17. The canned motor as claimed in claim 1, wherein the end section is further configured to be exposed at least in an axial direction at each axial end of the end section.

18. The canned motor as claimed in claim 1, wherein the end section extends, in an axial direction, beyond an axial end of the at least one can element.

19. The canned motor as claimed in claim 1, wherein the end section of the at least one support ring is further configured to be exposed in the radial direction on a radial inner side of the support section.

\* \* \* \* \*